United States Patent [19]
Hain, Jr. et al.

[11] Patent Number: 5,535,229
[45] Date of Patent: Jul. 9, 1996

[54] DIGITAL DATA TRANSFER SYSTEM FOR USE ESPECIALLY WITH ADVERTISEMENT INSERTION SYSTEMS

[75] Inventors: John A. Hain, Jr., Giles; H. G. Rusty Thornhill, Cumberland, both of Tenn.

[73] Assignee: Global Interconnect, Corp., Crossville, Tenn.

[21] Appl. No.: 59,902

[22] Filed: May 10, 1993

[51] Int. Cl.$^6$ .................................................. G06F 11/10
[52] U.S. Cl. .................. 371/53; 395/185.02; 332/120; 455/102
[58] Field of Search ............................. 371/53, 61, 68.2, 371/33, 31, 32; 332/119, 151, 120; 455/102; 395/185.01, 185.05

[56] References Cited

U.S. PATENT DOCUMENTS

| | | | |
|---|---|---|---|
| 4,724,491 | 2/1988 | Lambert | 358/310 |
| 4,814,883 | 3/1989 | Rerine et al. | 358/181 |
| 4,849,811 | 7/1989 | Kleinerman | 358/133 |
| 4,888,767 | 12/1989 | Furuya et al. | 370/95.2 |
| 4,939,731 | 7/1990 | Reed et al. | 371/32 |
| 4,939,789 | 7/1990 | Sakashita et al. | 455/260 |
| 5,023,717 | 6/1991 | Lamnabhi et al. | 358/140 |
| 5,079,525 | 1/1992 | Ishikawa et al. | 332/127 |
| 5,200,749 | 4/1993 | Grosby et al. | 341/87 |
| 5,216,515 | 6/1993 | Steele et al. | |
| 5,257,403 | 10/1993 | Rovina et al. | 355/45 |
| 5,283,639 | 2/1994 | Esch et al. | 348/6 |
| 5,301,194 | 4/1994 | Seta | 370/95.1 |

FOREIGN PATENT DOCUMENTS

| | | | |
|---|---|---|---|
| 0231528 | 2/1990 | Japan | H04B 7/185 |

OTHER PUBLICATIONS

"Going Digital", *CableAvails*, Jun./Jul., 1992, pp. 22–24.
"Information Display Systems", Texscan MSI, 124 Charles Linbergh Drive, Salt Lake City, Utah 84116, pp. 1–4.
"M–Series Video Controller", Texscan MSI, 124 Charles Linbergh Drive, Salt Lake City, Utah 84116, pp. 1–4.
"Why Texscan's Ad Insertion Systems Build Confidence", Texscan MSI, 124 Charles Linbergh Drive, Salt Lake City, Utah 84116, pp. 1–2.

*Primary Examiner*—Robert W. Beausoliel, Jr.
*Assistant Examiner*—Albert Décady
*Attorney, Agent, or Firm*—Pitts & Brittian

[57] ABSTRACT

A system (10) for transferring digital data from one data bank to another. The system (10) is designed especially for transmitting audio/video signals in digital format from a central processing center (16) to a plurality of cable networks for viewing either instantaneously or in the future. The system (10) incorporates four processing units: a central processing unit (16), a transmission processing unit (18), a receiving processing unit (20), and a master processing unit (22). The central processing unit (16) includes a scripter computer (24) for receiving a video signal (26), converting it to a digital signal (30), and storing the digital signal (30). The transmission processing unit (18) includes a transmission computer (34) and associated transmission hardware (36). The transmission computer (34) will attach a checksum to the end of each packet of information to be sent, along with any other identifying and scheduling information related to that particular file. The transmission hardware (36) sends the data blocks to a satellite (40). The receiving processing unit (20) includes receiving hardware (46) and an associated receiving computer (48). The master processing unit (22) is comprised of at least a master computer (50), a plurality of slaves (54), and a matrix hardware (56).

16 Claims, 6 Drawing Sheets

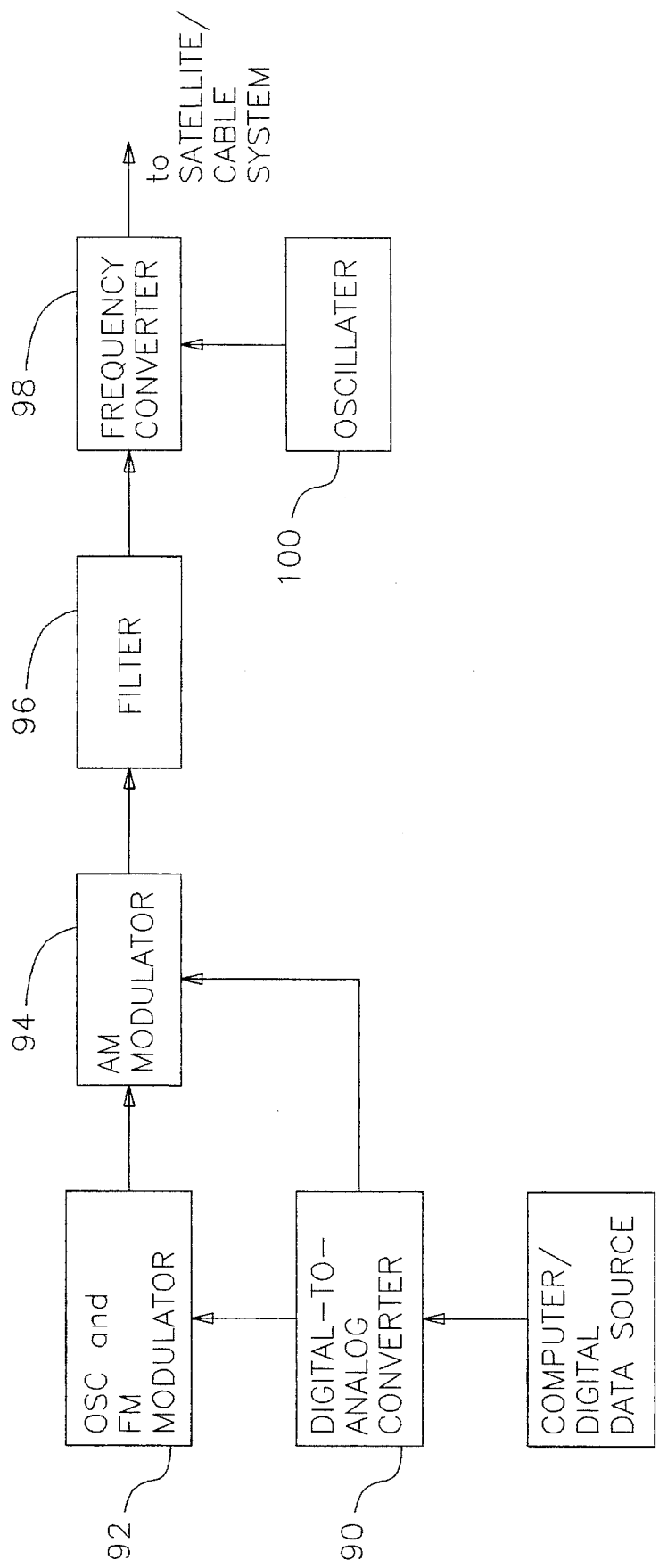

DIGITAL DATA TRANSFER SYSTEM FOR USE ESPECIALLY WITH ADVERTISEMENT INSERTION SYSTEMS

TECHNICAL FIELD

This invention relates to the field of digital data transmission. More specifically, the present invention relates to a system for transmitting data, and especially video and audio, from a transmitting station to a plurality of receiving stations. The present invention relates to a system for inserting commercial advertisements into programs aired by networks accessed through cable providers.

BACKGROUND ART

In the field of television, and especially cable television, it is well known that programming includes a selected amount of time allotted for local programming known as local avails. It is also known that programming provided by a network may at times be pre-empted for local programming. Typically, for each advertisement that is to be inserted, a great amount of physical labor is involved.

In the field of television advertising, it is well known that the common method of distribution is a cumbersome and labor-intensive process. A hard copy of the commercial to be aired is typically distributed to each station which will be airing the commercial. The commercials gathered by a particular station must be cataloged, and stored. When a particular commercial is to be aired, it must be found in storage and retrieved. After the commercial has aired, the tape must then be refiled. The process used today is substantially performed manually.

Other devices have been produced for pre-empting network broadcasts with local advertisements or other local programming. Typical of the art is that device disclosed in U.S. Pat. No. 4,814,883 issued to M. C. Perine, et al. on Mar. 21, 1989. However, the Perine device as disclosed is capable only of real time transmission of data. Further, each network to which data is to be transmitted must be provided with a separate computer, or slave, for transmitting that data. Perine does not disclose a device for transmitting the same data set to multiple locations simultaneously.

It is well known that the receipt of data transmitted via satellite is delayed from the time of transmission by at least a fraction of a second. Depending on the number of satellites required to transmit the data, the delay may be as long as several seconds. Therefore, it is difficult to transmit via satellite in real time. Due to the transmission delay, one or more of the receiving sites may not receive the transmitted data. If transmitting an advertisement to be aired in real time results in a faulty transmission, the broadcast of the advertisement will reflect the fault.

Therefore, it is an object of this invention to provide a means for generating an audio/visual segment, transmitting that segment to at least one receiving site, and storing that segment for future broadcast to at least one broadcasting network.

It is another object of the present invention to provide such a system wherein the audio/visual segment is converted to digital data prior to transmission thereof and converted back to audio/visual after successful transmission thereof.

Another object of the present invention is to provide a means for reducing the transmission time required for successful transmission of the selected audio/visual segment.

Still another object of the present invention is to provide a means for insuring the integrity of the data during the transmission of the same to a plurality of receiving sites.

Yet another object of the present invention is to provide a means for broadcasting a selected audio/visual segment to a selected plurality of broadcast networks simultaneously using a single hardware device.

DISCLOSURE OF THE INVENTION

Other objects and advantages will be accomplished by the present invention which serves to transfer digital data from one data bank to another. The system is designed especially for transmitting audio/video signals in digital format from a central processing center to a plurality of cable networks for viewing either instantaneously or in the future, but in either case, for storage and future broadcasting of the same. The system of the preferred embodiment of the present invention incorporates four processing units. On the transmission side of the system, a central processing unit and a transmission processing unit are provided. On the broadcasting side of the system, a receiving processing unit and a master, or rebroadcasting, processing unit are provided.

The central processing unit of the preferred embodiment includes a scripter computer for receiving a video signal, converting it to a digital signal, and storing the digital signal. After the files have been converted to digital format, each is sent to a central computer for storage. In the central computer, the digital data files are prepared for transmission and/or archived. The central computer serves to monitor the digital data files in storage and the scheduling for transmission of the digital data files to the selected destinations. The central computer may also serve to monitor the scheduling of the ultimate broadcasting of each commercial. The central computer also includes a commercially available modem as one method of communicating with the master processing unit of the receiving side of the system of the present invention.

The transmission processing unit is comprised of a transmission computer and associated transmission hardware. When the central computer recognizes that a particular digital data file is to be transmitted, the file is sent to the transmission computer. The transmission computer will attach a checksum to the end of each packet, or block, of information to be sent, along with any other identifying and scheduling information related to that particular file. The transmission computer will record all of the checksums inserted, and the locations in which they were inserted such that when the digital data files are received, the accuracy of each transmission may be checked and verified.

The digital data blocks are then routed to the transmission hardware. The transmission hardware then routes the data blocks to a transmission medium such as a satellite. In order to get the data to the satellite, a commercially available satellite uplink is employed. In order to enable transmission of the digital data via satellite, the transmission hardware component configures the signal to make it appear and handle as video.

One method which may be incorporated to improve the speed of transmission is to provide transmission hardware memory instead of the transmission computer memory due to the time required to deliver the data from the transmission computer to the transmission hardware. Thus, the data may be dumped directly into the transmission hardware memory. After the data has been selectively processed by the transmission computer and hardware, the data is delivered to the satellite uplink and then up to the transmission satellite. The transmission satellite then re-broadcasts the data back down to earth and is received by at least one downlink.

The receiver processing unit is comprised of receiving hardware and an associated receiving computer. The downlink forwards the data to the receiving hardware. The receiving hardware, which is substantially an inverse of the transmission hardware, processes the serial/parallel stream of data and converts it back into a parallel format. The data is then delivered to the receiving computer where it is compiled and placed in a file to be transferred into the master processing unit.

Prior to being delivered to the master processing unit, the receiving computer checks each checksum attached to each data block to verify its integrity. If the checksum reveals that the particular data block has been received properly, then that data block will be delivered to the master processing unit. However, if the checksum reveals a problem in transmission, a request will be made to the transmission computer to re-broadcast that particular block.

The receiver computer, which is substantially the inverse of the transmission computer, receives the transmitted data, stores it into memory, generates a checksum, and compares that checksum with the checksum affixed by the transmission computer. If the proper checksum is generated, then the receiving computer indicates that a data block of sound integrity has been received. Ultimately, the receiving computer generates a file identical to that transmitted by the transmission processing unit.

If any of the transmitted data blocks are not received properly, the receiving computer will send indication to the master processing unit that portions of the file are missing. The master processing unit will then request re-transmission of the corrupted data block. The receiving computer will retain all data blocks which have been received in tact until all of the data blocks have been accurately received. Upon receipt of the entire data file, the receiving computer then reconfigures the data so that the data file is in proper order.

The master processing unit is comprised of at least a master computer, a plurality of slaves, and a matrix hardware. The master computer serves to receive and store the data files. For any data blocks which have been indicated as having been improperly received, the master computer communicates with the transmission computer to request re-broadcast of the damaged data blocks. In the preferred embodiment, these requests are made via a modem associated with the master computer, over a standard telephone line, and through the modem associated with the central computer on the transmission side of the system. These requests might also be made via satellite by providing an uplink on the receiving side of the system and a downlink on the transmission side of the system.

After all of the data blocks have been received properly, the file may then be archived or inserted into a selected network's programming. Identification information attached to data blocks re-broadcast by the transmission computer is checked by the receiver computer of the preferred embodiment to determine whether or not it is needed. Information re-broadcast and not needed by the particular video network will be ignored.

After the complete file has been transmitted to the receiving computer and then delivered to the master computer, the file may be broadcast and/or archived for future broadcast to the public. A portion of the information sent to the receiving side of the system is scheduling information regarding that particular commercial. The master computer will, at a selected time prior to the airing of the commercial, retrieve the commercial and direct it to a slave. A plurality of slave computers are provided for temporary storage of commercials in the queue for airing. The slaves are also provided for the conversion of the file into video and audio and for the delivery of the commercials to the appropriate network signals at the proper time. If a particular commercial is to air on more than one network at the same time, then one slave may be used to deliver that commercial to all of the appropriate networks. If two or more different commercials are to air on different networks at the same time, a separate slave will be required to air each commercial at the appropriate time. However, if two or more different commercials are to air at different times, they may be queued in the memory of the same slave computer and aired at their respective appropriate times. The master computer of the preferred embodiment is used to determine which slave each individual commercial is directed toward. The master computer will respond to the signal delivered by the cable system and then direct the appropriate slave computer to begin its pre-roll time to count down to sending the commercial. When the commercial is finished, and if there are no other commercials to be inserted, the signal from the slave is broken and the signal from the network is restored.

The matrix hardware is comprised of a plurality of circuitry devices, with one each provided for a particular network. Each matrix hardware is served by six slave computers in the preferred embodiment. If there exists a need for more networks or for slave computers, multiple matrices may be used.

An alternate method of processing the data to be transmitted may be used in order to speed the transmission of the data. The transmitter computer may send the digital data to a digital-to-analog (D-A) converter, such as that on a modem. The D-A converter is a part of the transmission hardware. A portion of the digital data is directed toward an FM modulator. The remaining portion of the digital data is directed through an AM modulator. The FM modulator is separate from the uplink hardware. After the data has been sent to either the AM modulator or the FM modulator, the modulated data is added together. The total signal is filtered to limit the bandwidth and is then processed through a frequency converter to convert the signal to a frequency within the frequency range of the transmitter satellite. An oscillator is then used to allow for the access of a satellite network. The oscillator may be fixed frequency or synthesized.

BRIEF DESCRIPTION OF THE DRAWINGS

The above mentioned features of the invention will become more clearly understood from the following detailed description of the invention read together with the drawings in which:

FIG. 5 is a block diagram of an alternate method of processing data prior to the transmission of the same in accordance with several features of the present invention.

BEST MODE FOR CARRYING OUT THE INVENTION

Figure 1:
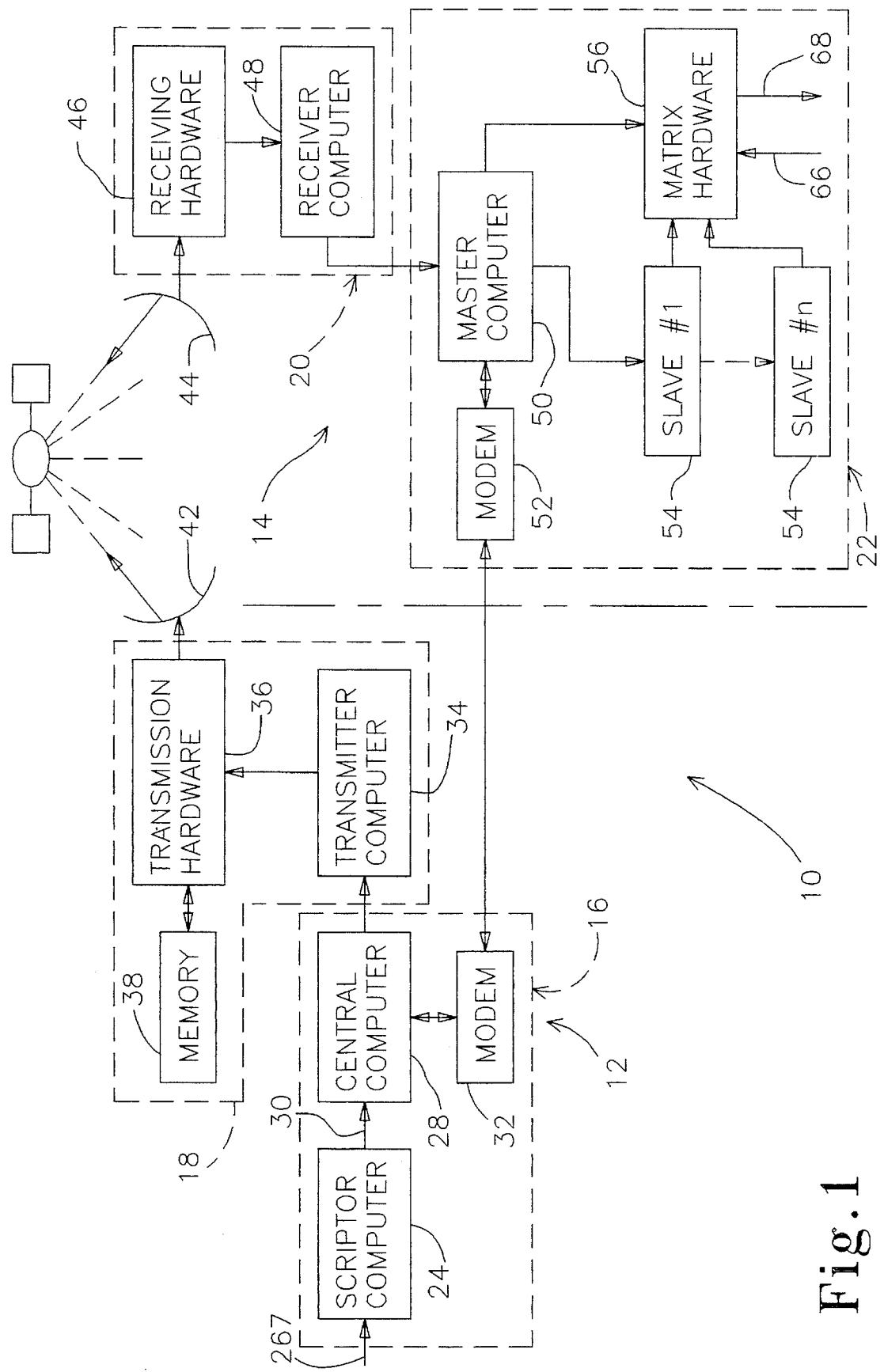
FIG. 1 is a block diagram illustrating a preferred architecture of the system of the present invention.

A system for transferring digital data from one data bank to another incorporating various features of the present invention is illustrated generally at 10 in the figures. The system 10 is designed especially for transmitting audio/video signals in digital format from a central processing center 16 to a plurality of cable networks for viewing either instantaneously or in the future, but in either case, for storage and future broadcasting of the same. Though the preferred embodiment of the system 10 is described as being used for transmitting television commercials to local television stations through their respective local cable companies, the system 10 of the present invention may be used to transmit any other type signal.

The system 10 of the preferred embodiment of the present invention incorporates four processing units. It will be understood, however, that other systems will accomplish similar tasks while incorporating more or less than four units. This may be accomplished by combining or dividing the functions of the processing units of the preferred embodiment. On the transmission side 12 of the system 10, a central processing unit 16 and a transmission processing unit 18 are provided. On the receiving and broadcasting side 14 of the system 10, a receiving processing unit 20 and a master, or re-broadcasting, processing unit 22 are provided.

The central processing unit 16 of the preferred embodiment is comprised of a scripter computer 24 and a central computer 28. The scripter computer 14 receives a video signal 26 (i.e., a television commercial), converts the video signal 26 to a digital signal 30, and then stores the digital signal 30. The digital signal 30 may be received from a video tape, or it may be received directly from a video camera.

After the files have been converted to digital format, each file is sent to the central computer 28 for storage. In the central computer 28, the digital data files are prepared for transmission and/or archived. The central computer 28 serves to monitor the digital data files in storage and the scheduling for transmission of the digital data files to the selected destinations.

In the preferred embodiment, the central computer 28 also serves to monitor the scheduling of the ultimate broadcasting of each commercial. The scheduling procedure entails the storage of such information as, for example, commercial A is to air on cable system B, network 12 at 2:00 p.m., Jun. 1, 1993. For each commercial, the exact broadcast times on each network of each cable system will be stored. In the preferred embodiment, dedicated software is provided for scheduling commercials. Of course, when the system 10 of the present invention is used for transmission of digital data only, and not for re-broadcast, the use of re-broadcast information is not required.

The central computer 28 also includes a commercially available modem 32 as one method of communicating with the master processing unit 22 of the receiving side of the system 10 of the present invention. The specific uses of the modem 32 will be discussed later in the description of the preferred embodiment of the present invention.

The transmission processing unit 18 is comprised of a transmission computer 34 and associated transmission hardware 36. When the central computer 28 recognizes that a particular digital data file is to be transmitted, the file is sent to the transmission computer 34. The transmission computer 34 will attach a checksum to the end of each packet, or block, of information to be sent, along with any other identifying and scheduling information related to that particular file. The transmission computer 34 will record all of the checksums inserted, and the locations in which they were inserted such that when the digital data files are received, the accuracy of each transmission may be checked and verified.

In the present invention, the files are transmitted in blocks of 65 K bytes of memory, with checksums added at the end of each. However, it will be understood that any length of data may be sent before being checked. Obviously, it will take longer to replace a larger block if a transmission is not accurately received. However, on the other hand, it would take a greater amount of time to transmit a larger number of shorter blocks of data due to an increased number of checksums required, and an associated increased number of checksum comparisons and validations.

The digital data blocks are then routed to the transmission hardware 36. The transmission hardware 36 then routes the data blocks to a transmission medium. In the preferred embodiment shown in the figures, the transmission medium is a satellite 40. In order to get the data to the satellite 40, a commercially available satellite uplink 42 is employed.

In order to enable transmission of the digital data via satellite 40, the transmission hardware component 36 configures the signal to make it appear and handle as video. The peak-to-peak amplitude 72 of the signal in the preferred embodiment is one volt (1 V), which is a parameter dictated by existing transmission satellites 40. Obviously, the present invention could be adapted to various other peak-to-peak signal amplitudes 72 as required.

The data is delivered to the transmission satellite 40 in 16-bit words 74. Each word 74 is delivered in a serial stream of eight two-bit parallel segments 78, each two-bit segment 78 being delivered in one time period of a selected length, or time slot 76. The two-bit segments 78 may be the binary 00, 01, 10, or 11. Binary 00 has an amplitude of 0.25 V above the baseline, 01 defines an amplitude of 0.5 V above the baseline, 10 defines 0.750 V above the baseline, and, it follows, 11 defines an amplitude of 1.0 above the baseline. This type of transmission is similar to that of modem-type transmissions. This allows for faster transmission requiring a narrower bandwidth. The sixteen bits of data could be transmitted in a purely serial form by transmitting either a 0 or a 1, with the increments above the baseline being reduced to 0.125 V.

One method which may be incorporated to improve the speed of transmission is to provide transmission hardware memory 38 instead of the transmission computer memory due to the time required to deliver the data from the transmission computer 34 to the transmission hardware 36. Thus, the data may be dumped directly into the transmission hardware memory 38.

Figure 2:
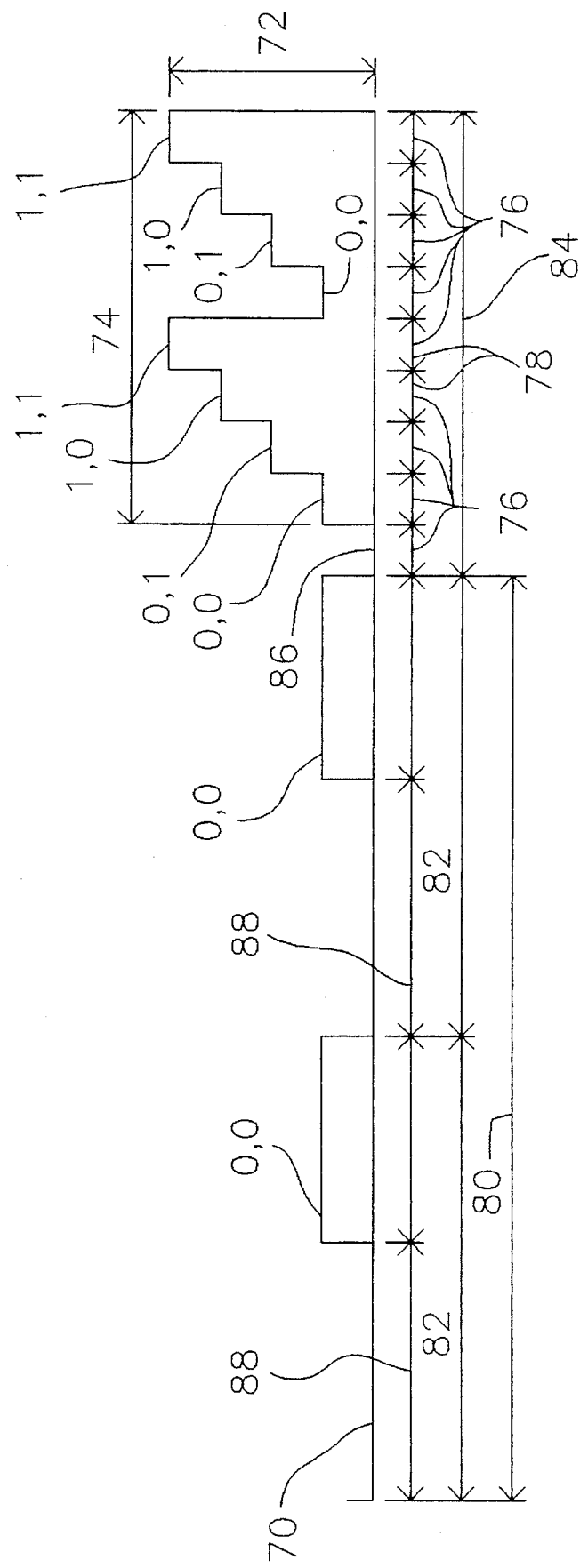
FIG. 2 is a portion of one possible time line illustrative of the transmission signal delivered from a transmission site to at least one receiving site in accordance with the present invention as illustrated in FIG. 1.

At the beginning of each 16-bit word 74 is attached a synchronization symbol 86 (or "sync 86"). In the preferred embodiment, each sync 86 is a one time slot 76 interval wherein a signal at 0 V, or baseline, is transmitted. Shown in FIG. 2 is a time line 70 for a typical signal which may be transmitted by the transmission hardware 36, as controlled by the transmission computer 34. The time line 70 is divided into nine-time-slot 82 cycles. The first time slot 76 is a sync 86, while the remaining eight time slots 76 are used to transmit data at two bits per time slot 76. Therefore, each data transmission cycle 84 transmits 16 bits of data, or one 16-bit word 74.

Shown are two cycles 82 which comprise a trainer cycle 80 used to train the hardware component clock of the receiving hardware component 46. There could be any number of nine-time-slot cycles 82 in the trainer cycle 80. In the preferred embodiment, each cycle 82 in the trainer cycle 80 includes five time slots 76 at the baseline voltage immediately followed by four time slots 76 at the first step above the baseline, or at 0.25 V. The five-time-slot period at baseline voltage may also be referred to as a wide sync 88 which signifies that no data is to be transmitted in the remainder of that cycle 82, but allows for the continued communication of the transmission hardware 36 and the receiving hardware 46. It is envisioned that fifty or more nine-time-slot cycles 82 may comprise the trainer cycle 80. The nine-time-slot cycles 82 are repeated at least until the receiving computer clock has been trained as to the time required to receive one 16-bit data transmission cycle 84.

The third data transmission cycle shown in FIG. 2 is a data transmission cycle 84 which is a 16-bit word 74 to be sent two bits at a time. The illustrated word 74, in binary, is 00, 01, 10, 11, 00, 01, 10, 11. Once received by the receiving computer 48, the eight 2-bit pieces are put back together as the 16-bit word 74, after which another sync 86 is inserted, followed by another 16-bit data transmission cycle 84. The profile illustrated for the 16-bit word 74 is exemplary only. For a four-division peak-to-peak amplitude 72 and eight two-bit segments in a word 74, there are four times eight (4×8), or thirty-two (32) possible 16-bit word profiles.

After the data has been selectively processed by the transmission computer 34 and hardware 36, the data is delivered to the satellite uplink 42 and then up to the transmission satellite 40. The transmission satellite 40 then re-broadcasts the data back down to earth and is received by a downlink 44. Due to the nature of a satellite transmission, there may be any number of downlinks 44 to which the data may be transmitted simultaneously. The downlinks 44 may be any commercially available downlinks 44. The downlinks 44 may be located anywhere in the United States, as well as any foreign country. In the preferred embodiment, one downlink 44 is provided for each cable television provider. Again, it will be understood that the system 10 of the present invention is not intended to be limited to the transmission of advertisement inserts for television. The system 10 of the present invention may be used for transmitting any other selected type of information as well. For example, the system 10 of the present invention may be used to transmit news information to a plurality of television stations for use in their respective news reporting formats.

The receiver processing unit 20 is comprised of receiving hardware 46 and an associated receiving computer 48. The downlink 44 forwards the data to the receiving hardware 46. The receiving hardware 46, which is substantially an inverse of the transmission hardware 36, processes the serial/parallel stream of data and converts it back into a parallel format. The data is then delivered to the receiving computer 48 where it is compiled and placed in a file to be transferred into the master processing unit 22.

Prior to being delivered to the master processing unit 22, the receiving computer 48 checks each checksum attached to each data block to verify its integrity. If the checksum reveals that the particular data block has been received properly, then that data block will be delivered to the master processing unit 22. However, if the checksum reveals a problem in transmission, a request will be made to the transmission computer 34 to re-broadcast that particular block.

The receiver computer 48, which is substantially the inverse of the transmission computer 34, receives the transmitted data, stores it into memory, generates a checksum, and compares that checksum with the checksum affixed by the transmission computer 34. If the proper checksum is generated, then the receiving computer 48 indicates that a data block of sound integrity has been received. Ultimately, the receiving computer 48 generates a file identical to that transmitted by the transmission processing unit 18.

If any of the transmitted data blocks are not received properly, the receiving computer 48 will send indication to the master processing unit 22 that portions of the file are missing. The master processing unit 22 will then request re-transmission of the corrupted data block. The receiving computer 48 will retain all data blocks which have been received in tact until all of the data blocks have been accurately received. Upon receipt of the entire data file, the receiving computer 48 then reconfigures the data so that the data file is in proper order.

Figure 4:
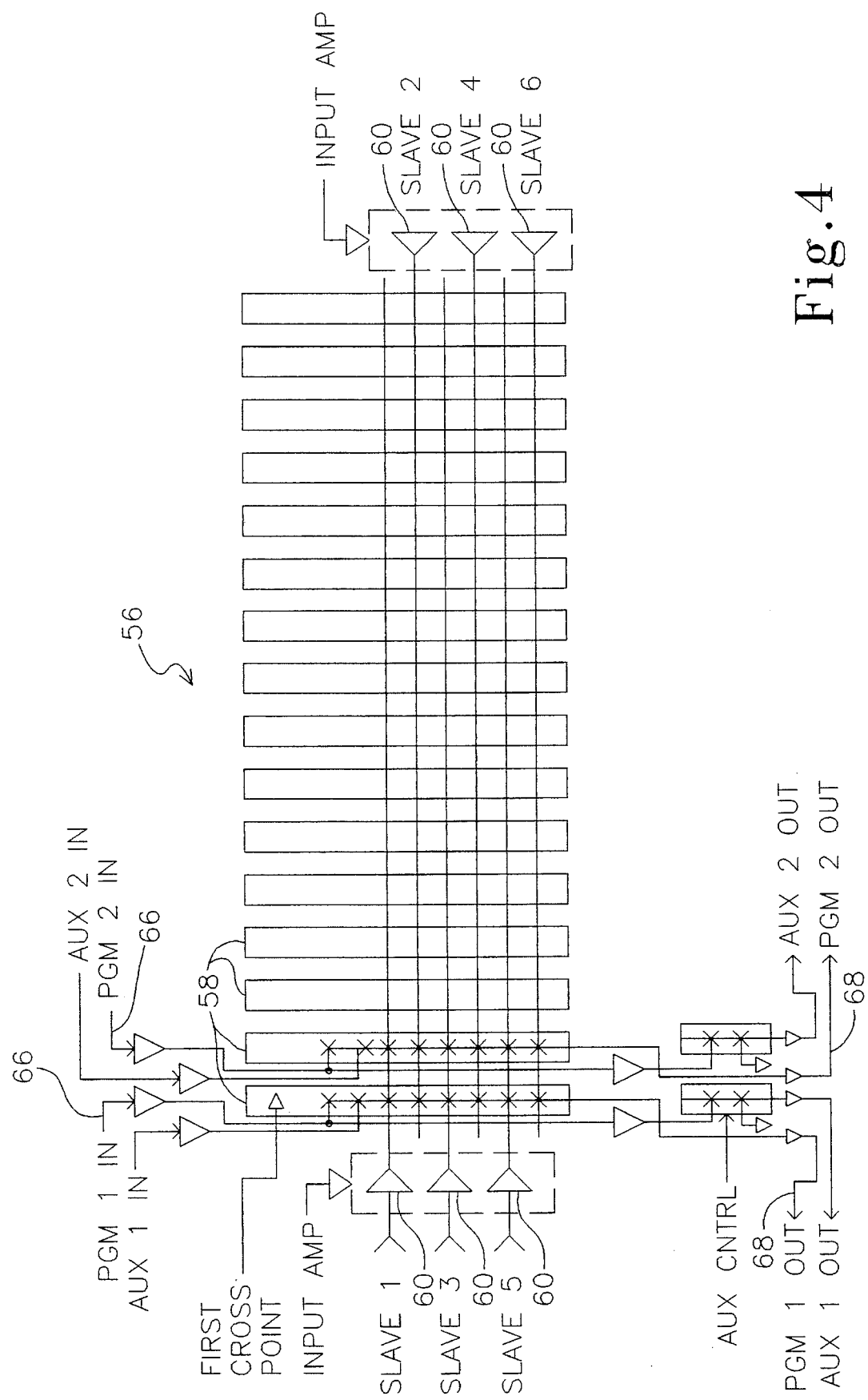
FIG. 4 is a schematic diagram of a portion of the matrix hardware of the present invention.

The master processing unit 22 is comprised of at least a master computer 50, a plurality of slaves 54, and a matrix hardware 56 (see FIG. 4 for an illustration of the matrix hardware 56). The master computer 50 serves to receive and store the data files. For any data blocks which have been indicated as having been improperly received, the master computer 50 communicates with the transmission computer 34 to request re-broadcast of the damaged data blocks. In the preferred embodiment, these requests are made via a modem 52 associated with the master computer 50, over a standard telephone line, and through the modem 32 associated with the central computer 28 on the transmission side of the system 10. These requests might also be made via satellite 40 by providing an uplink (not shown) on the receiving side 14 of the system 10 and a downlink (not shown) on the transmission side 12 of the system 10.

Because there may be a large number of video networks receiving a particular digital data file, the central computer 50 will pause a selected amount of time sufficient to allow each video network to indicate whether or not the integrity of the transmitted data was maintained. After this pause, the central computer 50 will send the requested data blocks to the transmitter computer 34 along with information as to whom the specific data blocks are being directed.

After all of the data blocks have been received properly, the file may then be archived or inserted into a selected network's programming. Identification information attached to data blocks re-broadcast by the transmission computer 34 is checked by the receiver computer 48 of the preferred embodiment to determine whether or not it is needed. Information re-broadcast and not needed by the particular video network will be ignored.

After the complete file has been transmitted to the receiving computer 48 and then delivered to the master computer 50, the file may be broadcast and/or archived for future broadcast to the public. A portion of the information sent to the receiving side of the system 10 is scheduling information regarding that particular commercial. In the example given above, commercial A was to air on cable system B, network 12 at 2:00 p.m., Jun. 1, 1993. Suppose, then, that at cable system B, commercial A is received. Commercial A would then be archived until it was to air. The scheduling information would be processed and continually monitored in order to insure the commercial would air at the proper time and on the proper network.

The master computer 50 will, at a selected time prior to the airing of the commercial, retrieve the commercial and direct it to a slave 54. For example, the time period may be one hour. Therefore, at 1:00 p.m. on Jun. 1, 1993, the master computer 50 will retrieve commercial A.

A plurality of slave computers 54 is provided for temporary storage of commercials in the queue for airing. The slaves 54 are also provided for the conversion of the file into video and audio and for the delivery of the commercials to the appropriate network signals 66 at the proper time. If a particular commercial is to air on more than one network at the same time, then one slave 54 may be used to deliver that commercial to all of the appropriate networks. If two or more different commercials are to air on different networks at the same time, a separate slave 54 will be required to air each commercial at the appropriate time. However, if two or more different commercials are to air at different times, they may be queued in the memory of the same slave computer 54 and aired at their respective appropriate times. The master computer 50 of the preferred embodiment is used to determine which slave 54 each individual commercial is directed toward.

At 2:00 p.m. on Jun. 1, 1993, the cable system will send a tone to warn that the commercial is to start in a selected amount of time. For instance, the cable company may give a warning of eight seconds. The master computer 50 will respond to the signal delivered by the cable system and then direct the appropriate slave computer 54 to begin its pre-roll time to count down to sending the commercial. At exactly 2:00 p.m., the master computer 50 will then go to a matrix hardware 56 to switch the input signal from the network to the slave computer 54. When the commercial is finished, and if there are no other commercials to be inserted, the signal 68 from the slave 54 is broken and the signal 66 from the network is restored.

As shown in FIG. 4, the matrix hardware 56 is comprised of a plurality of circuitry devices, or input amplifiers 58, with one each provided for a particular network. In the preferred embodiment, the matrix hardware 56 includes sixteen input amplifiers 58. Each matrix hardware 56 is served by six slave computers 54 in the preferred embodiment. Therefore, in the preferred embodiment, six different commercials may be aired on any selection of the sixteen networks at any one time. If there exists a need for more networks or for slave computers 54, multiple matrices 56 may be used.

So, from the example above, at 1:00 p.m., the master computer 50 will retrieve commercial A and send it to slave 1. Slave 1 will then prepare the commercial for airing. At 8 seconds before 2:00 p.m., the cable system will signal that a local commercial should be starting soon. The master computer 50 will receive this signal and then instruct slave 1 to begin pre-roll. At exactly 2:00 p.m., the commercial will convert the commercial to audio/video and begin to roll on network 12. After the airing of commercial B, the normal programming of network 12 will be resumed.

Figure 3A:
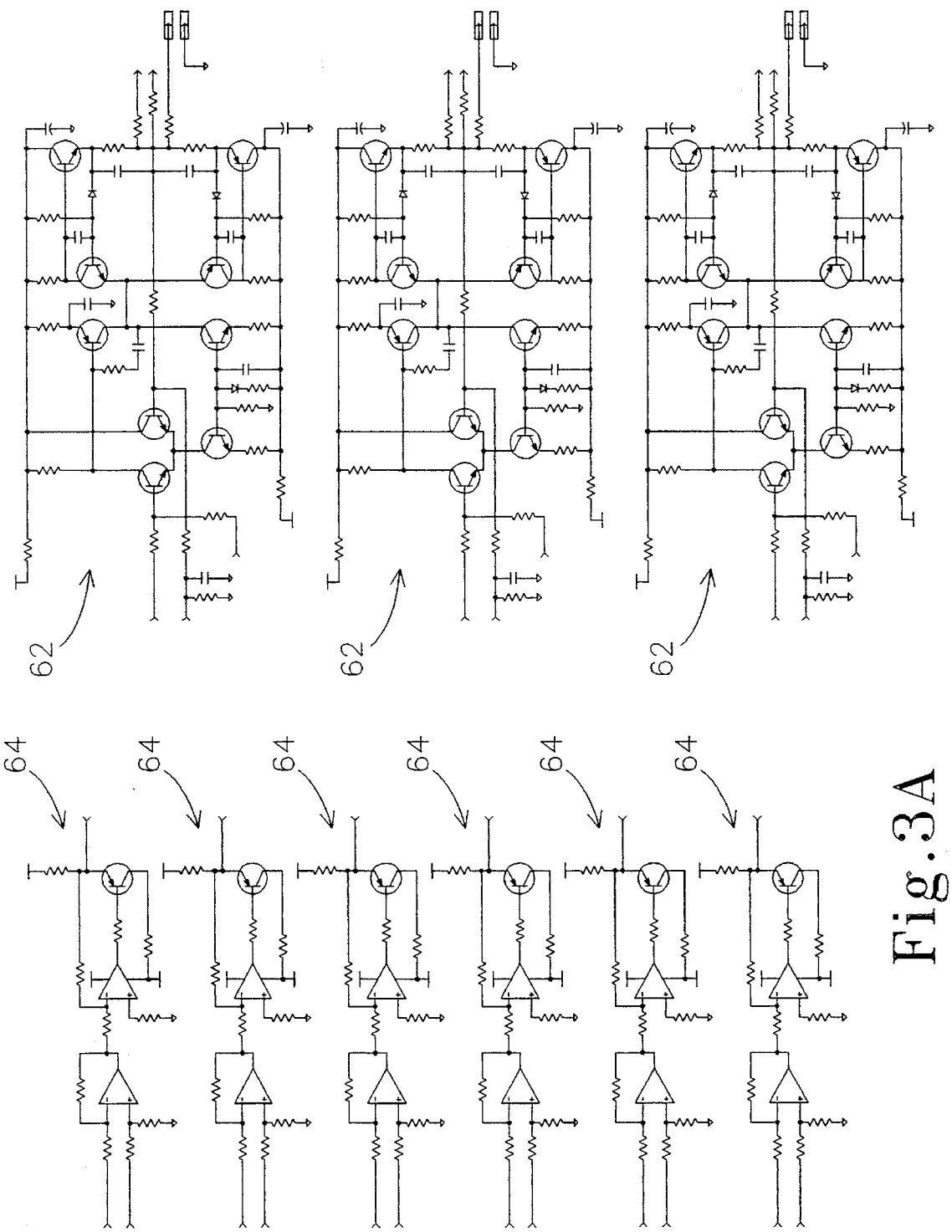
FIGS. 3A and 3B are schematic diagrams of a matrix hardware circuitry board constructed in accordance with several features of the present invention.
Figure 3B:
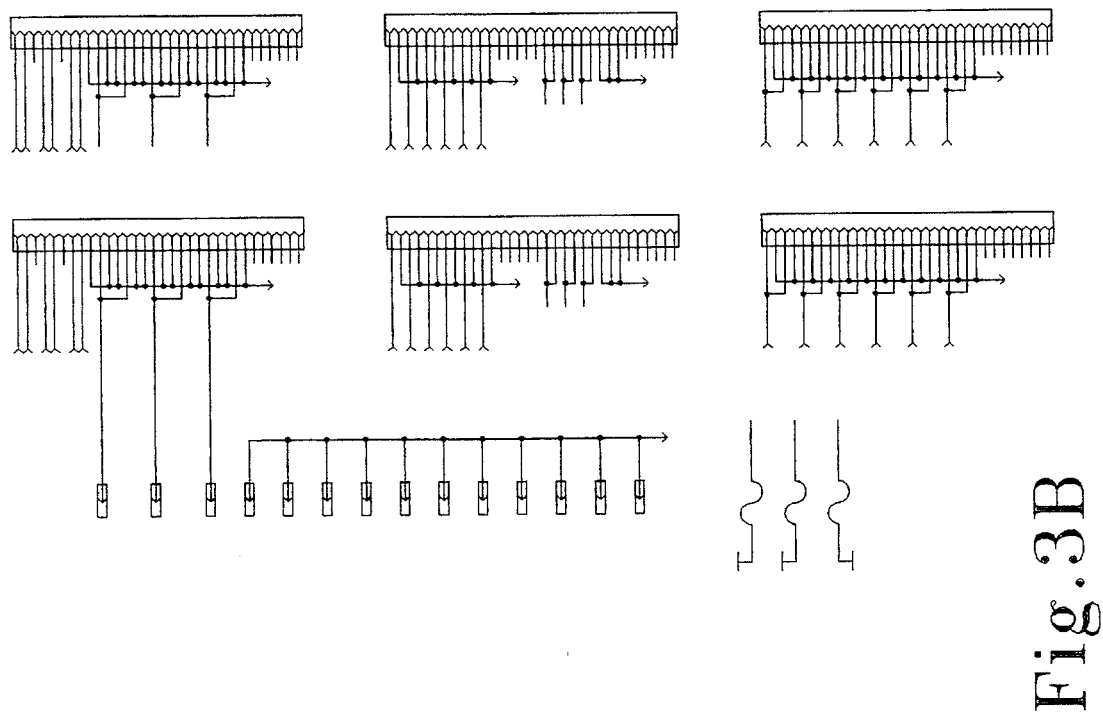
Figure 3B:
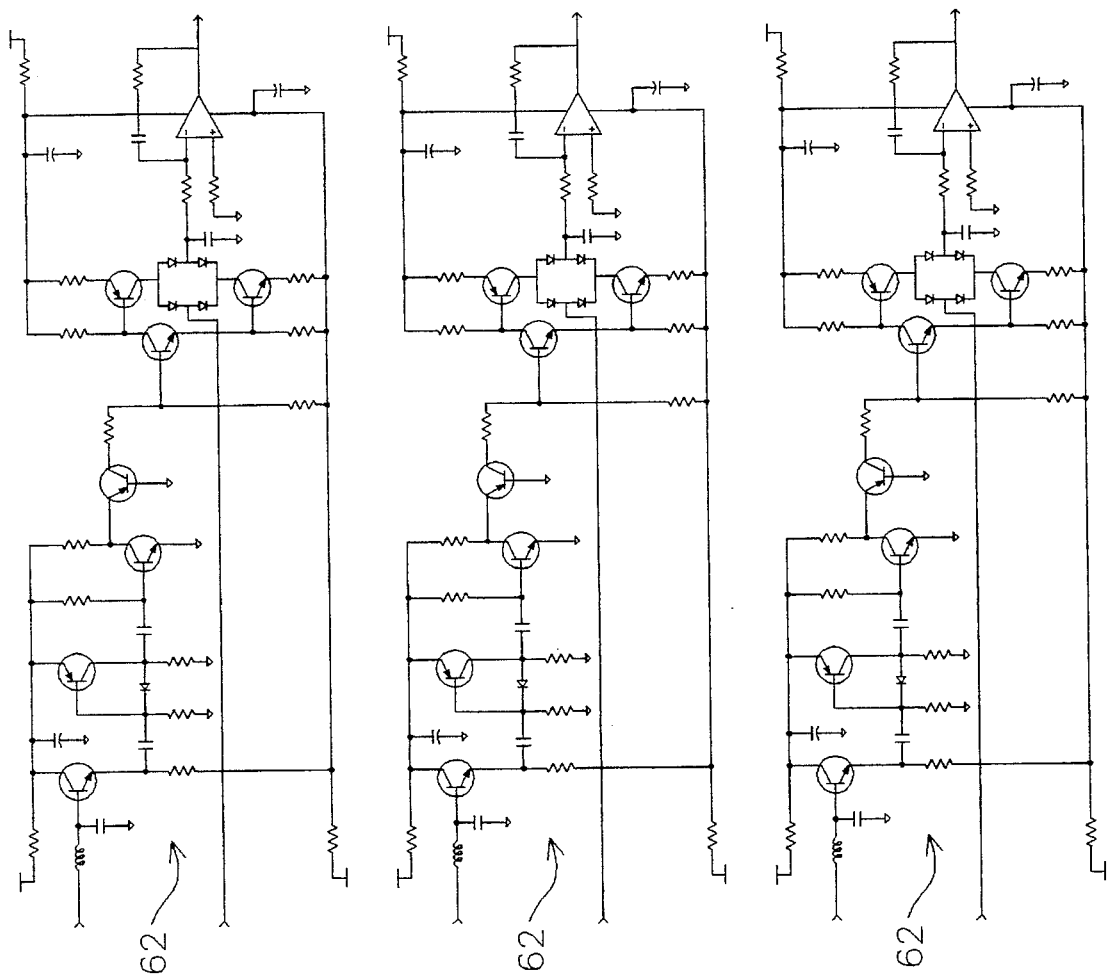

FIGS. 3A and 3B are schematic diagrams showing the preferred embodiment of the circuitry of the input amplifier 58 of the present invention. Shown at 60, generally, are the inputs from the respective slave computers 54. As shown, each circuitry board 58 of the preferred embodiment is used to control three slave computers 54. Shown at 62 are the independent circuits for the video, one for each slave 54. Shown generally at 64 are the individual circuits for the stereo audio output.

Shown are six audio inputs—A3, A4, A5, A6, A7, and A8. A3 and A4 may be used in conjunction with the first slave, A5 and A6 for the second slave, and A7 and A8 for the third slave. Alternatively, the six audio inputs may be used as either the right or left networks for salves 1–6.

For each matrix 56 of the present invention, two input amplifier cards 58 are provided in order to serve six slave computers 54. The second input amplifier card 58 will be substantially similar to the first, with the six audios serving the left and right networks of the 4th, 5th, and 6th slave computers 54, or the remainder of the left or right audio networks of the six slaves 54, depending upon the connection of the first input amplifier card 58.

Input A2 as shown is provided for the insertion of alternate programming as opposed to advertisement insertion. By providing for the application of an alternate programming insertion system, the system 10 of the present invention may be readily adapted to existing insertion equipment without extraordinary costs to the user. The additional insertion system also provides greater flexibility of programming.

Referring now to FIG. 5, an alternate method of processing the data to be transmitted is described. In this figure, the transmitter computer 34 sends the digital data to a digital-to-analog (D-A) converter 90, such as that on a conventional modem. The D-A converter 90 is a part of the transmission hardware 36. Typically, all of the digital data is directed to an FM modulator 92, which is typically a part of the uplink hardware 42. However, in this embodiment, only a portion of the digital data is directed toward the FM modulator 92. The remaining portion of the digital data is directed through an AM modulator 94. To accomplish this, the FM modulator 92 is separate from the uplink hardware 42.

After the data has been sent to either the AM modulator 94 or the FM modulator 92, the modulated data is added together. The total signal is filtered at 96 to limit the bandwidth and is then processed through a frequency converter 98 to convert the signal to a frequency within the frequency range of the transmitter satellite 40. The frequency converter 98 of the preferred embodiment is a portion of the satellite uplink system 42.

An oscillator 100 is then used to allow for the access of a satellite 40 network. The oscillator 100 may be fixed frequency or synthesized.

From the foregoing description, it will be recognized by those skilled in the art that a system for transferring digital data from one data bank to another offering advantages over the prior art has been provided. Specifically, the system is designed for transmitting audio/video signals in digital format from a central processing center to a plurality of cable networks for viewing either instantaneously or in the future, but in either case, for storage and future broadcasting of the same. The system of the present invention may also be used to transmit any other type signal.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,
We claim:

1. A system for transferring digital data from a sending site to at least one receiving site, said system comprising:
    a central processor for receiving selected data and converting said data to a digital format;
    a transmission processor for affixing at least one integrity monitoring indicator to said data for transmission with said data, said transmission processor including a device for converting said digital data to an analog signal, an FM modulator for modulating a portion of said analog signal to an FM signal, an AM modulator for modulating said FM signal with a remainder of said analog signal to an AM signal, a filter to limit a bandwidth of said FM signal and said AM signal, a frequency converter for converting said FM signal to a first center frequency and said AM signal to said first center frequency, and an oscillator for oscillating said FM signal and said AM signal simultaneously within a single bandwidth;

a transmission medium;

a receiver for receiving said data transmitted through said transmission medium and for examining said integrity monitoring indicator to determine whether said data was properly transmitted; and a master processor for communicating with said transmission processor to indicate any portion of said data received improperly and to indicate when said data is properly and completely received.

2. The system of claim 1 wherein said central processor includes at least a scripter computer and a central computer, said scripter computer for receiving said video signal and for converting said signal to a digital format, said central computer for preparing said digital signal for transmission to said receiver, storing said digital signal, monitoring a schedule for transmission of said digital signal, and sending said signal to said transmission processor.

3. The system of claim 1 wherein said transmission processor includes at least a transmission computer and transmission hardware, said transmission computer for affixing said integrity monitoring indicator to said data, said transmission hardware for delivering said data to said transmission medium.

4. The system of claim 1 wherein said receiver includes at least receiving hardware and a receiving computer, said receiving hardware for receiving said data from said transmission medium, said receiving computer for examining said integrity monitoring indicator, said receiving computer further for communicating with said master processor results from said examination of said integrity monitoring indicator, said receiving computer further for configuring said data received through said transmission medium to be identical to said data transmitted from said transmission processor, and said receiving computer further for sending said data to said master processor.

5. The system of claim 1 wherein said master processor includes at least a master computer for receiving and storing said data from said receiving processor, said master computer further for communicating to request retransmission of selected portions of said data, said selected portions being corrupted in previous transmission, and said master computer further for monitoring a schedule for broadcast of said data over a plurality of selected broadcast networks.

6. The system of claim 5 wherein said master processor further includes a plurality of slave computers for receiving said data to be broadcast from said master computer, said plurality of slave computers further for converting said data to an audio/visual format for said broadcast, and said plurality of slave computers for broadcasting said data to said plurality of selected broadcast networks in accordance to said schedule.

7. The system of claim 6 wherein said master processor further includes a hardware device for interfacing said plurality of slave computers with said plurality of selected broadcast networks.

8. A system for transferring digital data from a sending site to at least one receiving site, said system comprising:

a central processor for receiving selected data and converting said data to a digital format;

a transmission processor for affixing at least one integrity monitoring indicator to said data for transmission with said data, said transmission processor including at least a device for convening said digital data to an analog signal, an FM modulator for modulating a portion of said analog signal to an FM signal, an AM modulator for modulating said FM signal with a remainder of said analog signal to an AM signal, a filter to limit a bandwidth of said FM signal and said AM signal, a frequency converter for convening said FM signal to a first center frequency and said AM signal to said first center frequency, and an oscillator for oscillating said FM signal and said AM signal simultaneously within a single bandwidth;

a transmission medium, said transmission medium being a conventional satellite system;

a receiver for receiving said data transmitted through said transmission medium and for examining said integrity monitoring indicator to determine whether said data was properly transmitted; and a master processor for communicating with said transmission processor to indicate any portion of said data received improperly and to indicate when said data is properly and completely received.

9. The system of claim 8 wherein said central processor includes at least a scripter computer and a central computer, said scripter computer for receiving said video signal and for converting said signal to a digital format, said central computer for preparing said digital signal for transmission to said receiver, storing said digital signal, monitoring a schedule for transmission of said digital signal, and sending said signal to said transmission processor.

10. The system of claim 8 wherein said transmission processor further includes a transmission computer and transmission hardware, said transmission computer for affixing said integrity monitoring indicator to said data, said transmission hardware for delivering said data to said transmission medium.

11. The system of claim 8 wherein said receiver includes at least receiving hardware and a receiving computer, said receiving hardware for receiving said data from said transmission medium, said receiving computer for examining said integrity monitoring indicator, said receiving computer further for communicating with said master processor results from said examination of said integrity monitoring indicator, said receiving computer further for configuring said data received through said transmission medium to be identical to said data transmitted from said transmission processor, and said receiving computer further for sending said data to said master processor.

12. The system of claim 8 wherein said master processor includes at least a master computer for receiving and storing said data from said receiving processor, said master computer further for communicating to request retransmission of selected portions of said data, said selected portions being corrupted in previous transmission, and said master computer further for monitoring a schedule for broadcast of said data over a plurality of selected broadcast networks.

13. The system of claim 12 wherein said master processor further includes a plurality of slave computers for receiving said data to be broadcast from said master computer, said plurality of slave computers further for converting said data to an audio/visual format for said broadcast, and said plurality of slave computers for broadcasting said data to said plurality of selected broadcast networks in accordance to said schedule.

14. The system of claim 13 wherein said master processor further includes a hardware device for interfacing said plurality of slave computers with said plurality of selected broadcast networks.

15. A system for transferring digital data from a sending site to at least one receiving site, said system comprising:

a central processor for receiving selected data and converting said data to a digital format, said central processor including at least a scripter computer and a central computer, said scripter computer for receiving said video signal and for converting said signal to a digital format, said central computer for preparing said digital signal for transmission to said receiver, storing said digital signal, monitoring a schedule for transmission of said digital signal, and sending said signal to said transmission processor;

a transmission processor for affixing at least one integrity monitoring indicator to said data for transmission with said data, said transmission processor including a device for converting said digital data to an analog signal, an FM modulator for modulating a portion of said analog signal to an FM signal, an AM modulator for modulating said FM signal with a remainder of said analog signal to an AM signal, a filter to limit a bandwidth of said FM signal and said AM signal, a frequency converter for converting said FM signal to a first center frequency and said AM signal to said first center frequency, an oscillator for oscillating said FM signal and said AM signal simultaneously within a single bandwidth, a transmission computer and transmission hardware, said transmission computer for affixing said integrity monitoring indicator to said data, said transmission hardware for delivering said data to said transmission medium;

a transmission medium;

a receiver for receiving said data transmitted through said transmission medium and for examining said integrity monitoring indicator to determine whether said data was properly transmitted, said receiver including at least receiving hardware and a receiving computer, said receiving hardware for receiving said data from said transmission medium, said receiving computer/br examining said integrity monitoring indicator, said receiving computer further for communicating with said master processor results from said examination of said integrity monitoring indicator, said receiving computer further for configuring said data received through said transmission medium to be identical to said data transmitted from said transmission processor, and said receiving computer further for sending said data to said master processor; and a master processor for communicating with said transmission processor to indicate any portion of said data received improperly and to indicate when said data is properly and completely received, said master processor includes at least a master computer, a plurality of slave computers, and an interface hardware device, said master computer for receiving and storing said data from said receiving processor, said master computer further for communicating to request retransmission of selected portions of said data, said selected portions being corrupted in previous transmission, and said master computer further for monitoring a schedule for broadcast of said data over a plurality of selected broadcast networks, said plurality of slave computers for receiving said data to be broadcast from said master computer, said plurality of slave computers further for converting said data to an audio/visual format for said broadcast, and said plurality of slave computers for broadcasting said data to said plurality of selected broadcast networks in accordance to said schedule, said interface hardware device for interfacing said plurality of slave computers with said plurality of selected broadcast networks.

16. The system of claim 15 wherein said transmission medium is a conventional satellite system.

\* \* \* \* \*